United States Patent [19]

Breford

[11] 3,897,086
[45] July 29, 1975

[54] PIN BOX
[75] Inventor: Glenn H. Breford, Holyrood, Kans.
[73] Assignee: Midway Industries, Inc., Holyrood, Kans.
[22] Filed: Sept. 10, 1973
[21] Appl. No.: 395,566

[52] U.S. Cl............................................. 280/438 R
[51] Int. Cl.².......................................... B62D 53/08
[58] Field of Search .......... 280/423, 438, 439, 440, 280/5 C

[56] References Cited
UNITED STATES PATENTS

| | | | |
|---|---|---|---|
| 1,866,055 | 6/1932 | Reid..................................... | 280/5 C |
| 2,401,036 | 5/1946 | Armington et al.................. | 280/440 |
| 2,857,174 | 10/1958 | Brown............................. | 280/438 R |
| 2,923,560 | 2/1960 | Anderson........................ | 280/440 X |
| 3,392,992 | 7/1968 | Baker et al...................... | 280/423 R |
| 3,774,942 | 11/1973 | Holland ............................. | 280/440 |

Primary Examiner—Leo Friaglia
Assistant Examiner—R. Schrecengost
Attorney, Agent, or Firm—John H. Widdowson

[57] ABSTRACT

A tractor-trailer connector having an upper member mountable on a tongue portion of a trailer with a hitch engaging member pivotally mounted on a lower portion of the upper member, the hitch engaging member is pivotable about an axis generally aligned longitudinally with the trailer.

2 Claims, 5 Drawing Figures

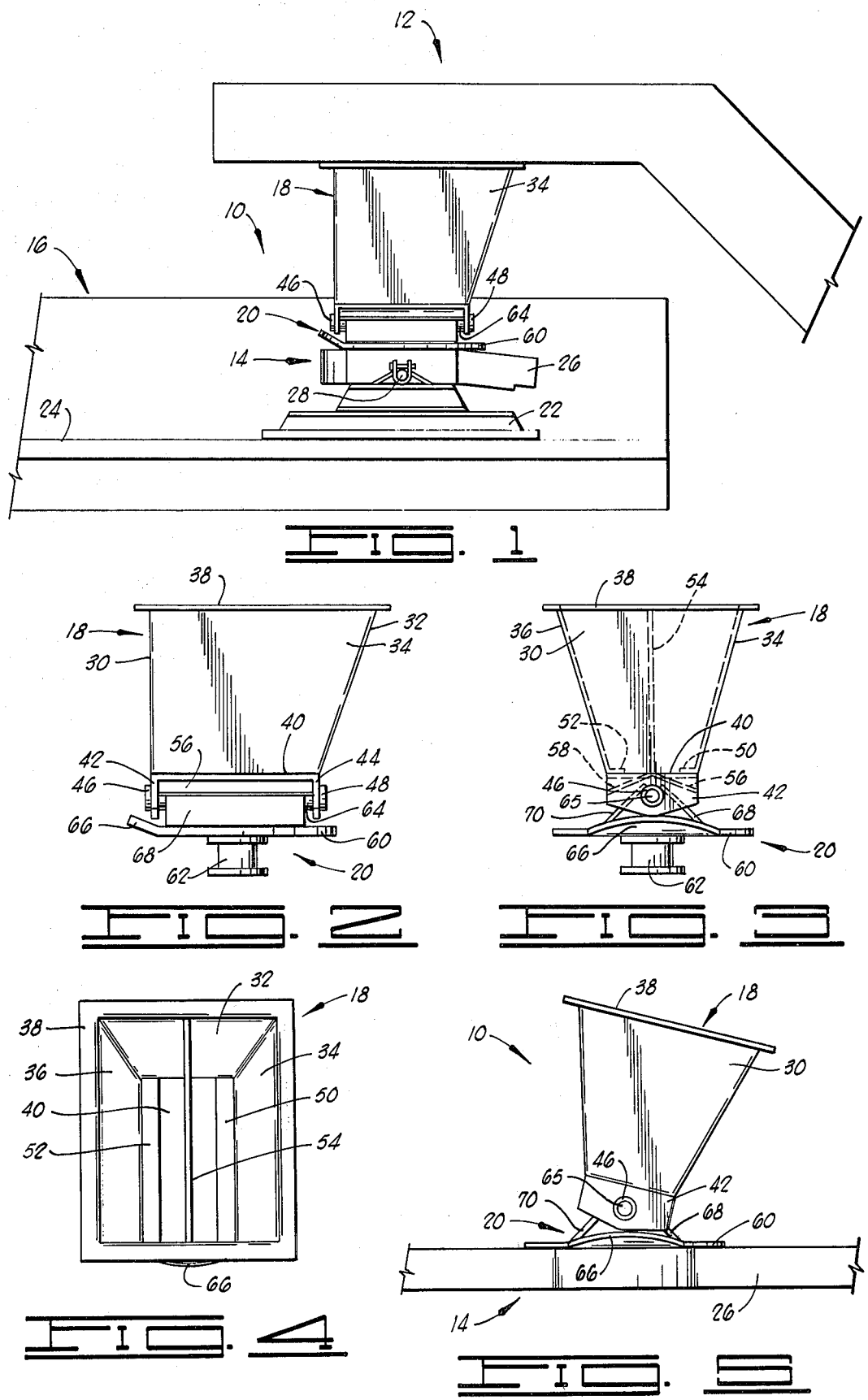

PIN BOX

BACKGROUND OF THE INVENTION

The invention is related to pivotable trailer hitch connectors for trailers having fifth wheel trailer hitches. Numerous constructions of fifth wheel trailer hitches and fifth wheel trailer hitch couplers are known in the prior art; however, these structures generally use a ball member and a socket member to achieve horizontal, vertical and yawing motion between the tractor vehicle and the trailer vehicle, or they use a coupling pin to achieve horizontal pivoting motion, a pivotal hitch to achieve vertical pivoting and have no provision for yawing motion between the vehicles. Of the latter identified constructions, such is typically used on lengthy commercial semi-trailer trucks and the like with the fifth wheel hitch mounted on the rear of the tractor vehicle. In these vehicles, the side to side pivoting motion is taken up in the structure of the trailer wherein the frame thereof is twisted. In the hitch constructions using the ball and socket, such are usually not desirable due to the expense involved in making the balls and sockets and periodic inspections thereof and replacements thereof. This type of hitch tends to wear considerably since the load is at all times carried on a relatively small portion of the ball and socket. For the trailer hitches of the fifth wheel type generally used with small utility trailers and travel trailers and the like, the fifth wheel hitch is constructed to pivot such that there can be vertical motion between the pulling vehicle and the trailer as well as pivoting in the horizontal direction; however, generally there is no pivotal connection in the hitch apparatus for side to side pivoting of the vehicles, one relative to the other.

SUMMARY OF THE INVENTION

In a preferred specific embodiment, a pin box structure includes an upper member mountable on the tongue portion of a trailer and extending below such with a hitch engaging member pivotally mounted on a lower portion of the upper member wherein the hitch engaging member is pivotable on an axis generally longitudinal aligning with the trailer. The hitch engaging member is mountable with a fifth wheel type trailer hitch; and due to its pivotal connection with the upper member and the trailer, it will pivot so as to allow free side to side pivoting motion of the trailer relative to the towing vehicle and the fifth wheel trailer hitch.

One object of this invention is to provide a pin box structure overcoming the aforementioned disadvantages of the prior art devices.

Still, another object of this invention is to provide a pin box structure which can be used with a fifth wheel type trailer hitch and will provide for pivoting motion between the trailer and the fifth wheel trailer hitch pivotable about an axis generally aligning longitudinally with the trailer to permit side to side pivoting of the trailer relative to the towing vehicle.

Still, one other object of this invention is to provide a pin box structure having an upper member rigidly mountable on the tongue of a trailer where the trailer is a type designed for use with a fifth wheel trailer hitch.

Yet, another object of this invention is to provide a pin box structure which is a portion of a tractor-trailer towing connector and has an upper member rigidly mounted in a depending relation on the tongue of the trailer with the upper member having a hitch engaging member pivotally mounted on a lower portion thereof and further which is mounted to pivot about an axis generally longitudinally aligned with the trailer to permit yawing motion or side to side motion of the trailer relative to the hitch on the towing vehicle.

Various other objects, advantages, and features of the invention will become apparent to those skilled in the art from the following discussion, taken in conjunction with the accompanying drawing, in which:

DESCRIPTION OF THE DRAWING

FIG. 1 is a side elevation view of the rear portion of a truck bed having a fifth wheel trailer hitch and the tongue portion of a trailer with portions of the truck bed cut away for clarity, having the pin box secured to the trailer tongue and mounted with the fifth wheel trailer hitch;

FIG. 2 is a side elevation view of the pin box structure alone;

FIG. 3 is a front elevation view of the pin box structure alone with portions of the interior thereof shown in outline;

FIG. 4 is a top plan view of the pin box structure alone; and

FIG. 5 is a front elevation view of the pin box structure mounted in the hitched position with the center portion of a fifth wheel trailer hitch, the pin box being in a pivoted position.

The following is a discussion and description of preferred specific embodiments of the pin box structure of this invention, such being made with reference to the drawing, whereupon the same reference numerals are used to indicate the same or similar parts and/or structures. It is to be understood that such discussion and description is not to unduly limit the scope of the invention.

DESCRIPTION OF PREFERRED EMBODIMENTS

Referring to the drawing in detail and in particular to FIG. 1, a pin box structure of this invention, generally indicated at 10, is shown mounted on the tongue portion of a trailer 12, and mounted in a fifth wheel trailer hitch 14 which is mounted in a truck bed 16. The pin box structure 10 includes an upper member 18 and a hitch engaging member or lower member 20 that is pivotally mounted with a lower portion of the upper member 18. The upper member 18 is mounted in a depending relation on the trailer tongue 12. The hitch engaging member 20 is mounted on the lower portion of the upper member 18 and it is constructed and adapted to lockably engage the latching mechanism of the fifth wheel type trailer hitch 14.

The fifth wheel trailer hitch 14 is preferably the type having a frame structure 22 secured to the floor 24 in the bed of a truck 16 with a pin support member 26 attached to the frame 22 by a pivotal mount 28. The hitch pin support member 26 is constructed to receive and pivotally hold therein a locking pin of the type used with the pin box 10. The pin supporting member 26 is supported by the mount 28 such that it will pivot about an axis transverse to the longitudinal direction of the truck.

The upper member 18 is a box-like structure which is attachable on its upper portion to the trailer tongue 12 and which has a mount on its lower portion to pivotally mount the hitch engaging member 20. The figures of the drawing clearly show the preferred structure of the upper member 18. The upper member 18 is preferably constructed having four generally upright sidewalls as shown with the forward sidewall indicated at 30, the rear sidewall at 32, and the side sidewalls at 34 and 36 with all the sidewalls preferably joined by welding. A flange 38 is preferably welded to the top of the sidewalls and extends peripherally therefrom as shown. The upper member 18 has a bottom member 40 joined to the bottom of the sidewalls 30, 32, 34 and 36, preferably by welding. A mount for mounting the hitch engaging member 14 is on the lower portion of the upper member and has downwardly extending flange portions 42 and 44 on the normally forward side of the bottom member 40 and the normally rearward side thereof of the bottom member 40 as shown. The flange portions 42 and 44 are provided with shaft support members 46 and 48, respectively, for mounting a shaft. The sidewalls 34 and 36 has inwardly extending flanges 50 and 52, respectively, which are secured to the upper surface of the upper member bottom member 40, preferably by welding. An upper member interior brace member 54 extends in an upright position longitudinally through a center plane of the box-like upper member structure as shown and it is preferably secured to the forward sidewall 30, the rear sidewall 32 and the bottom 40, preferably by welding. The mount portion of the upper member 18 has a pair of brace members 56 and 58 angularly disposed as shown in FIG. 3 joining the downwardly extending flange portions 42 and 44 and secured to the bottom member 40. The brace members 56 and 58 provide structural strengthening and support for the flange members 42 and 44 and due to their position provide some protection for the shaft mount of the hitch engaging member 20.

The hitch engaging member 20 includes a shoe 60 having a coupling pin 62 or hitch pin secured thereto and extending therebelow and a shaft mount 64 above the shoe 60 for receiving and mounting a shaft 65. The shoe 60 is preferably generally circular in planform and has an upturned forward portion 66. The coupling pin 62 is preferably constucted as shown and secured to the shoe, preferably by welding. The specific structure of the coupling pin 62 can obviously be modified to be compatible with the particular structure of the fifth wheel hitch. The shaft mount 64 is a hollow member to receive and support the shaft 65 and it is supported by brace members 68 and 70 as shown in FIGS. 2 and 3. The shaft mount 64 is preferably secured by welding to the brace members 68 and 70 in the position shown with the elongated axis thereof in line with the forward-to-rear axis of the shoe 60. The lower portion of the braces 68 and 70 are preferably secured by welding to the upper portion of the shoe 60. An important feature of this invention is that the axis of the shaft 65 be in longitudinal alignment with the longitudinal axis of the trailer when the pin box upper member 18 is attached to the trailer tongue portion 12. The shaft mount 64 on the hitch engaging member 20 contacts the center portion of the shaft 65 and the shaft support members 46 and 48 of the flanges 42 and 44 on the mount of the upper member 18 contact opposite ends of the shaft 65 to support the shaft 65 so that the upper member 18 and the hitch engaging member 20 can pivot about the longitudinal axis of the shaft 65. Preferably, the shaft mount 64 functions as a bearing with the opposite ends of the shaft 65 rigidly supported by the support members or flanges 46 and 48. Securing the shaft 64 to the support members 46 and 48 can be accomplished by the use of set screws extending through the support members into the shaft 65 or by welding the opposite ends of the shaft 65 to the support member, or by any other suitable means. The shaft mount 64 can be constructed with an aperture therein for lubricating the shaft 65 in its mount to reduce friction. With the upper member 18 pivotally mounted to the hitch engaging member 20 it will pivot from side to side as illustrated in FIG. 5 wherein the upper member 18 is pivoted slightly to the right relative to the hitch engaging member 20. Preferably, the upper member 18 is freely pivotable within structural limits of the flanges 42 and 44 and the shoe 60. Preferably, the upper member 18 is constructed such that it will pivot to the side approximately 45° from the vertical in both directions.

In the use of the pin box 10 of this invention, it is preferably mounted on the bottom of the tongue portion of a trailer generally as shown in FIG. 1. The flange portion 38 of the upper member 18 is secured to the structure of the trailer tongue portion 12, preferably by welding or bolting or other suitable means. Pin box 10 is secured to the trailer tongue portion 12 so the upturned or raised portion 66 so the shoe 60 is on the forward side thereof. The axis of the shaft 65 must be positioned in alignment with the longitudinal axis of the trailer. A trailer fitted with the pin box 10 of this invention is coupled with the fifth wheel trailer hitch 14 of a towing vehicle such as the truck 16 in the same manner as are trailers with prior art pin box assemblies. The pin box 10 of this invention due to the pivoting motion of the hitch engaging member 20 will allow the trailer to be coupled with the tractor vehicle when the two vehicles are on an uneven terrain and when there is an angular displacement between the two vehicles. As the fifth wheel hitch 14 is moved into position under the hitch engaging member 20, they will pivot relative to the bed of the towing vehicle and the pin box upper member 18 to bring the coupling pin 62 of the hitch engaging member 20 into proper alignment and position in the latch portion of the fifth wheel hitch 14. As this occurs, the shoe 60 will slide on the guide portion 26 of the hitch. The upturned shoe portion 66 is provided to assist in aligning the shoe 60 and the guide portion of the hitch pin support member 26 of the hitch 14 so that precise vertical alignment is not required and so the shoe 60 can be easily slid onto the hitch when the shoe 60 is slightly below the hitch pin suppoort member 26.

In the manufacture of the pin box structure of this invention, it is obvious that the structure can be easily constructed by conventional construction and fabricating techniques to achieve the end product. The pin box structure can be constructed of sufficient strength for use on travel trailers and with small utility trailers and it can also be constructed in larger sizes for the larger semi-trailer type truck trailers. The pivotal connection between the upper member and the hitch engaging member is constructed to withstand sustained pulling loads, backing loads, and substantial side forces as are normally encountered in the pin connection portion of a trailer of the type on which the pin box of this invention is designed to be used.

In the use and operation of the pin box structure of this invention, it is seen that same provides a connector for a trailer of the type which is connected with a towing vehicle by a fifth wheel type hitch and that such provides a pivotal connection between the vehicles which allows the trailer to pivot about a longitudinal axis relative to the towing vehicle or tractor vehicle. The pin box structure has a hitch engaging member which is pivotable relative to its attached upper member and likewise relative to the tongue portion of the trailer so that when the trailer is being pulled it will pivot about a longitudinal axis relative to the pulling vehicle and when the hitch and hitch engaging member are being coupled or uncoupled the pivotally mounted hitch engaging member will allow such to be done on an uneven terrain. When connecting a trailer having the pin box structure with a pulling vehicle, such makes the job considerably easier as it is not necessary to have the vehicles on a level terrain so the portions of the hitch and the pin will be in proper alignment. As will become apparent from the foregoing description of the applicant's pin box structure, relatively inexpensive and structurally simple means have been provided to pivotally connect a trailer of the type constructed for using a fifth wheel trailer hitch with the fifth wheel type trailer hitch of a tractor vehicle. The pin box structure is economical to manufacture due to the simple construction thereof and it is usable to provide a pivotal connection between a trailer vehicle and a towing vehicle due to the pivotal connection thereof. The pin box structure is adapted to allow a trailer vehicle to pivot about a longitudinal axis relative to the towing vehicle for smoother operation thereof on the road and for easier operation thereof when connecting or disconnecting the trailer and the towing vehicle.

While the invention has been described in conjunction with preferred specific embodiments thereof, it will be understood that this description is intended to illustrate and not to limit the scope of the invention, which is defined by the following claims.

I claim:

1. A tractor-trailer towing connector, comprising:
  a. an appreciably elongated, cross-sectionally rectangular, substantially hollow, normally vertically positioned upper member rigidly mountable on its upper end portion on a tongue portion of a trailer and extending downward from said tongue portion, said upper member having two opposed sides tapering inwardly from said upper end portion to said lower end portion, and being larger in cross-sectional area at the top than at the bottom,
  b. said upper member having means to pivotally mount a hitch engaging member on the lower end portion thereof,
  c. a hitch engaging member pivotally mounted on said means to mount same, said hitch engaging member having a shoe on an upper portion thereof, and a coupler pin rididly mounted on said shoe and depending therefrom, said hitch engaging member pivotable on an axis generally aligned with the longitudinal axis of said trailer, and
  d. said means to mount has a yoke mounted on said lower end portion of said upper member, a shaft mounted in said yoke, a sleeve mounted on said shaft and brace members rigidly secured to said sleeve and rigidly secured to said hitch engaging member, said connector is constructed and adapted to be mounted on a trailer tongue to connect it in towing relation to a tractor having a fifth wheel type hitch.

2. The connector of claim 1, wherein:
  a. said upper member has an outwardly extending flange around said top,
  b. said upper member has an internal brace member rigidly secured to opposed sides thereof in a center portion thereof generally aligned with said shaft, and
  c. said braces extend outwardly from said sleeve and are secured to said shoe on an upper portion of said shoe.

* * * * *